United States Patent Office 3,287,325
Patented Nov. 22, 1966

3,287,325
NOVEL CARBONYL AMINO SUBSTITUTED LACTONES AND POLYMERS THEREOF
Meurig Wyn Williams, Wilmington, Del., assignor to E. I. du Pont de Nemours and Company, Wilmington, Del., a corporation of Delaware
No Drawing. Filed June 22, 1965, Ser. No. 466,123
6 Claims. (Cl. 260—78.3)

This invention relates to novel lactones, and to novel copolyesters thereof with 2,2-dialkyl-3-propiolactones.

Fibers of polypivalolactone and other polymeric 2,2-dialkyl-3-propiolactones are valuable for the production of various textile materials, including garments requiring only minimum care. However, the fibers have a relatively low affinity for most dyes, a circumstance which severely restricts the suitability of the fibers for use in the production of colored fabrics.

In accordance with this invention, it has been found that certain easily hydrolyzable derivatives of 2-amino- and 2-aminomethyl-2-methyl-3-propiolactone can be readily prepared and have excellent utility in the preparation of copolyesters of 2,2-disubstituted propiolactones exhibiting, after treatment in an acid medium such as a solution of hydrogen bromide in acetic acid, excellent affinity for the commercially important class of acid dyes. More specifically, the novel lactones are compounds of the following formulas:

$$\underset{I}{\underset{\underset{CH_2-O}{|}}{\overset{XCO-NH}{\underset{|}{\overset{|}{CH_3-C-C=O}}}}} \quad \text{and} \quad \underset{II}{\underset{\underset{CH_2-O}{|}}{\overset{XCO-NH}{\underset{|}{\overset{|}{CH_3-C-C=O}}}}}$$

wherein X is hydrogen or arylmethoxy. Suitable examples of such arylmethoxy groups include benzyloxy, p-bromobenzyloxy, p-nitrobenzyloxy and α-naphthylmethoxy.

The preparation of the novel lactones of the invention is illustrated by the following examples. The preparation of N-benzyloxycarbonyl-C-methyl-DL-serine, referred to in Example 1, is described by De Wald, Behr, and Moore in J. Am. Chem. Soc., vol. 81, page 4364 (1959).

EXAMPLE 1

*2-benzyloxycarbonylamino-2-methyl-3-propiolactone*

A solution of 0.5 g. (0.002 mol) of N-benzyloxycarbonyl-C-methyl-DL-serine and 0.55 ml. (0.004 mol) of triethylamine in 2 ml. of methylene chloride is prepared, and 0.38 g. (0.002 mol) of p-toluenesulfonyl chloride is added while the solution is stirred at room temperature. After about 10 minutes a solid separates. After a total of 30 minutes, the mixture is washed with three 2-ml. portions of water, 2 ml. of dilute hydrochloric acid, and 2 ml. of dilute sodium bicarbonate. The resulting liquid is dried over magnesium sulfate and the methylene chloride is evaporated at room temperature. The syrupy product, 2 - benzyloxycarbonylamino - 2 - methyl - 3 - propiolactone, is characterized by its infra-red adsorption spectrum, which exhibits major peaks at 2.99μ, 3.30μ, 3.35μ, 3.40μ, 3.50μ, 5.45μ (characteristic of β-lactone carbonyl function), and 5.95μ (characteristic of urethanecarbonyl function). There are also small shoulders in the curve at 5.75μ and 5.85μ.

EXAMPLE 2

*2-formylaminomethyl-2-methyl-3-propiolactone*

Anhydrous ammonia is passed through a stirred solution of 124 g. (0.092 mol) of 2-chloromethyl-2-methyl-3-propiolactone in 500 ml. of anhydrous acetonitrile. The temperature is kept at 0–5° C. The product, 2-chloromethyl-2-methyl-3-aminopropionic acid, appears as a precipitate and is filtered after 6 hours. After the product is washed with acetone and dried, the yield is found to be 120 g. (86% of theory).

*Analytical data.*—Calculated for $C_5H_{10}NO_2Cl$: C, 39.6%; H, 6.6%; N, 9.2%; Cl, 22.4%. Found: C, 39.6%; H, 6.6%; N, 8.9% Cl, 22.7%.

Seventy-two g. (0.5 mol) of 2-chloromethyl-2-methyl-3-aminopropionic acid is disolsved in 600 ml. of 98% formic acid at 60° C. and 250 ml. of acetic anhydride is then added, with stirring, over a period of 30 minutes while the temperature is held at 55–65° C. The mixture is stirred at the same temperature for an additional 4 hours and is then evaporated at 60° C. under reduced pressure. The syrupy product, N-formyl-2-chloromethyl-2-methyl-3-aminopropionic acid, is subjected to molecular distillation at 180–185° C. at a pressure of 2 microns of mercury but still fails to crystallize.

*Analytical data.*—Calculated for $C_6H_{10}NO_3Cl$: C, 40.1%; H, 5.6%; N, 7.8%; Cl, 19.8%. Found: C, 39.4%; H, 5.8%; N, 7.6%; Cl, 17.8%.

Five g. (0.028 mol) of N-formyl-2-chloromethyl-2-methyl-3-aminopropionic acid is dissolved in 20 ml. of methylene chloride and stirred with an excess of aqueous sodium carbonate. The white solid which appears is filtered off and the filtrate is evaporated under reduced pressure to remove the methylene chloride. The syrupy product, 2-formylaminomethyl-2-methyl-3-propiolactone, is characterized by its infra-red adsorption spectrum, which exhibits strong absorption at 5.45μ (characteristic of β-lactone carbonyl function).

The novel lactones of Formulas I and II are readily copolymerized with 2,2-dialkyl-3-propiolactones of the formula $$\underset{III}{\underset{\underset{CH_2-O}{|}}{\overset{Q}{\underset{|}{\overset{|}{Q'-C-C=O}}}}}$$

wherein Q and Q' are the same or different alkyl radicals containing from 1 to 4 carbon atoms which may optionally be joined by a carbon-to-carbon bond to form an alicyclic ring. Typical 2,2-dialkyl-3-propiolactones with which the carbonyl-amino-substituted lactones of the invention may be copolymerized include pivalolactone ($Q=Q'=CH_3$), 2,2-diethyl-3-propiolactone ($Q=Q'=CH_2CH_3$), 2-methyl-2-ethyl-3-propiolactone ($Q=CH_3$, $Q'=CH_2CH_3$), 2,2-dipropyl-3-propiolactone ($Q=Q'=CH_2CH_2CH_3$), 2,2-dibutyl-3-propiolactone ($Q=Q'=CH_2CH_2CH_2CH_3$), and 2,2-pentamethylene-3-propiolactone ($Q+Q'=CH_2CH_2CH_2CH_2CH_2$)

The novel copolyesters so formed are characterized as linear polymers consisting essentially of a succession of recurring ester structural units, from about 90 to about 99.5% of said ester structural units being radicals of the formula $$\underset{IV}{\overset{Q}{\underset{|}{\underset{Q'}{\overset{|}{-CH_2-C-COO-}}}}}$$

wherein Q and Q' are as defined above and from 10 to 0.5% of said ester structural units consisting essentially of radicals of the formula $$\underset{V}{\underset{\underset{CH_3}{|}}{\overset{XCO-NH}{\underset{|}{\overset{|}{-CH_2-C-COO-}}}}} \quad \text{and} \quad \underset{VI}{\underset{\underset{CH_3}{|}}{\overset{XCO-NH \quad O}{\underset{|}{\overset{|}{-CH_2-C-\overset{\|}{C}-O-}}}}}$$

wherein X is as defined above.

The homopolymer prepared by the polymerization of 2,2-dialkyl-3-propiolactone is designated as poly(oxycarbonyl-1,1-dialkyldimethylene). It may also be named simply as poly(2,2-dialkyl-3-propiolactone). Other alternative names include multi(oxycarbonyl-1,1-dialkyldimethylene) and poly-(2,2-dialkylhydracrylic acid). The polymer in which $Q=Q'=CH_3$ is designated as poly(oxycarbonyl-1,1-dimethyldimethylene), and it is also known by alternative names such as poly(pivalolactone) and poly(hydroxypivalic acid). This polyester is readily prepared by the polymerization of pivalolactone, the intramolecular ester of hydroxypivalic acid, as disclosed by Reynolds and Vickers in their British Patent No. 766,347; or by the polymerization of hydroxypivalic acid as disclosed by Alderson in his U.S. Patent No. 2,658,055. The preparation of poly(oxycarbonyl-1-methyl-1-ethyldimethylene), poly(oxycarbonyl-1,1-diethyldimethylene), and other polyesters of this kind are described by Etienne and Fisher in their French Patent No. 1,231,163.

The novel copolyesters of the invention are advantageously prepared by polymerization of the lactones in the same manner as the corresponding homopolyesters, incorporating the appropriate amount of the lactone of Formula I or II. Copolymeric compositions are designated herein by listing each of the respective ester structural repeating units, followed by a list of the mol percentage values for each of the units. For instance, a copolyester comprised of 95% of the recurring structural units derived from pivalolactone and 5% of the recurring structural units derived from 2-formylamino-2-methyl-3-propiolactone is designated as poly(oxycarbonyl-1,1-dimethyldimethylene/oxycarbonyl - 1 - formylamino - 1-methyldimethylene) (95/5).

In the examples below, the term "inherent viscosity" is defined as the polymer property determined in accordance with the following relationship:

$$\eta_{inh} = \frac{\ln \eta_{rel}}{c}$$

wherein the relative viscosity, $\eta_{rel}$, is calculated by dividing the flow time in a capillary viscometer of a dilute solution of the polymer by the flow time for the pure solvent, trifluoroacetic acid. The concentration (c) used in the examples is 0.5 gram of polymer per 100 ml. of solution and the temperature used is 30° C. An inherent viscosity of at least about 0.5 is desired for the polymers employed in this invention to be used in films. For fiber applications an inherent viscosity of at least about 0.75 is desirable.

EXAMPLE 3

Using the general procedure of Example 1, 2.0 g. (0.008 mol) of N-benzyloxycarbonyl-C-methyl-DL-serine, 2.2 ml. (0.016 mol) of triethylamine, and 1.52 g. (0.008 mol) of p-toluenesulfonyl chloride are reacted together to form 2-benzyloxycarbonylamino-2-methyl - 3 - propiolactone. The syrupy product is dissolved in 160 ml. of acetonitrile and 40 ml. (39.2 g.; 0.39 mol) of pivalolactone is added. The solution is stirred vigorously and heated to 80° C. A 1.0 N solution of tetrabutylammonium hydroxide in methanol is prepared, and 0.2 ml. of the solution is added to the mixture. Stirring is continued for 6 hours while the temperature of the mixture is maintained at 80° C., after which the resulting precipitate is filtered off, washed well with acetone and methanol, and dried at 70° C. for 24 hours at a pressure of 10 mm. of mercury. The product contains 0.08% nitrogen by analysis, corresponding to incorporation of 0.6 mol percent of the 2-benzyloxycarbonylamino-2-methyl-3-propiolactone. The copolymer, poly(oxycarbonyl-1,1 - dimethyldimethylene/oxycarbonyl-1-benzyloxycarbonylamino-1-methyldimethylene) (99.0/0.6), has an inherent viscosity of 0.93, and a PMT of 220° C.

The copolymer is press-spun at 250° C. through an orifice 0.305 mm. (12 mils) in diameter, the resulting extruded filament being passed into ice water and wound at 366 meters/min. (400 y.p.m.). The filament is drawn 1.8× over a hot plate at 145° C., after which it is boiled off by immersion in boiling water for 30 minutes. As described in more detail in Example 4, the fibers can be treated so that they are capable of being dyed with acid dyes.

In another experiment, 1.25 g. (0.005 mol) of N-benzyloxycarbonyl-C-methyl-DL-serine is converted to 2-benzyloxycarbonylamino - 2 - methyl - 3 - propiolactone. The syrupy product is dissolved in 2 ml. of dioxan, added to a solution of 10 ml. (9.8 g.; 0.098 mol) of pivalolactone in 100 ml. of n-heptane and the resulting solution is heated to 70° C. and stirred rapidly. To this solution is added 0.1 ml. of a 1.0 N solution of tetrabutylammonium hydroxide in methanol, and the mixture is stirred overnight. The resulting precipitate is filtered off, washed well with acetone, and dried. The product contains 0.20% nitrogen by analysis, corresponding to incorporation of 1.4 mol percent of the 2-benzyloxycarbonylamino-2-methyl-3-propiolactone. The copolymer, poly(oxycarbonyl - 1,1 - dimethyldimethylene/oxycarbonyl - 1-benzyloxycarbonylamino-1-methyldimethylene) (98.6/1.4), has an inherent viscosity of 0.60. Films melt-pressed from the copolymer exhibit good flexibility. As described in more detail in Example 4, the films can be treated so that they are capable of being dyed to deep shades with acid dyes.

Similarly, 0.72 g. (0.005 mol) of 2-formylaminomethyl-2-methyl-3-propiolactone in 2 ml. of dioxan is reacted with 10 ml. (9.8 g.; 0.098 mol) of pivalolactone in 100 ml. of n-heptane at 70° C. with stirring in the presence of 0.1 ml. of a 1.0 N solution of tetrabutylammonium hydroxide in methanol as an initiator overnight to yield a copolymeric product, poly(oxycarbonyl-1,1-dimethyldimethylene/oxycarbonyl - 1 - formylaminomethyl-1-methyldimethylene) of high molecular weight from which films and fibers are formed.

The novel copolyesters prepared as described above are quite stable in molten form. They are readily processed by conventional melt spinning and drawing techniques to form fibers having physical properties generally comparable to those of the corresponding unmodified homopolyesters. However, the fibers of the novel copolyesters are adapted for greatly enhanced dyeability with respect to the corresponding homopolyesters. Prior to dyeing, the fibers are subjected to a pretreatment under acid conditions to remove the substituents on the amine groups in the copolyester. In this step the material comprising the fibers is converted to a linear copolyester consisting of a succession of recurring ester structural units, from about 90 to about 99.5% of said units being the radicals of Formula IV and the remaining 10 to 0.5% of said units being radicals of the formula

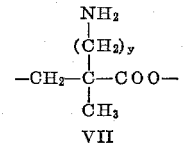

VII wherein y is 0 or 1. Fibers of these copolyesters containing primary amine groups display excellent affinity for acid dyes. The same dyes employed with fibers of the corresponding homopolyesters, even when adsorbed, are not washfast.

The following example illustrates the acid pretreatment and dyeing steps.

EXAMPLE 4

*Preparation of copolyesters containing primary amine groups*

Drawn filaments of poly(oxycarbonyl-1,1-dimethyldimethylene/oxycarbonyl - 1 - benzyloxycarbonylamino-1-methyl-dimethylene (99.4/0.6), prepared as described in Example 3, are immersed in a solution of 89 g. of hydrogen bromide in 400 ml. of acetic acid at room temperature for 30 minutes. The resulting filaments, comprised of poly(oxycarbonyl - 1,1 - dimethyldimethylene/oxycarbonyl-1-amino-1-methyl-dimethylene) (99.4/0.6), are washed with methanol. Two hundred (200) mg. of the resulting fibers are placed in a bath of 9 ml. of water, 1 drop of 10% sodium lauryl sulfate solution, 0.2 ml. of acetic acid, and 0.8 ml. of a 1% aqueous dye solution of the acid dye identified by Colour Index No. 62,055; the solution is adjusted to a pH of 2.0 with trifluoroacetic acid; and the fibers are then heated at 125° C. in this solution in a sealed tube for two hours. As the result of this treatment the fibers are dyed to a light shade of blue. A control sample of fibers of the corresponding homopolymer, poly(oxycarbonyl - 1,1-dimethyldimethylene), adsorbs virtually none of the dye, being unstained when treated in the same dyebath by the same procedure.

Melt-pressed films of poly(oxycarbonyl-1,1-dimethyldimethylene/oxycarbonyl - 1 - benzyloxycarbonylamino-1-methyl-dimethylene) (98.6/1.4), prepared as described in Example 3, are immersed for 10 minutes in the hydrogen bromide-acetic acid solution, washed with water, and dyed to a deep shade of blue with C.I. 62,055 dye.

Similarly, fibers and films of poly(oxycarbonyl-1,1-dimethyldimethylene/oxycarbonyl - 1 - formylaminomethyl-1-methyldimethylene), prepared as described in Example 3, are immersed for 10 minutes in 2 N aqueous hydrochloric acid, washed with water, and dyed to a deep shade of blue with C.I. 62,055 dye.

A wide variety of acid dyes are suitable for dyeing the copolymers of the present invention. In place of the blue acid dye identified by Colour Index No. 62,055 in the above example, acid dyes identified by Colour Index Nos. 18,820 (yellow) and 61,570 (green) may be employed.

I claim:

1. A novel lactone selected from the group consisting of

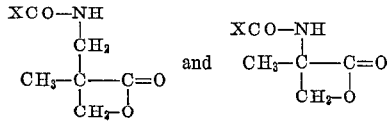

wherein X is selected from the group consisting of hydrogen and arylmethoxy.

2. 2 - benzyloxycarbonylamino - 2 - methyl - 3 - propiolactone.

3. 2-formylaminomethyl-2-methyl-3-propiolactone.

4. A copolyester having between about 90–99.5 mol percent of the following recurring structural unit

wherein Q and Q' are alkyl radicals of from 1–4 carbon atoms which may be joined by a carbon-to-carbon bond to form an alicyclic ring and between about 0.5 to 10 mol percent of at least one of the following recurring structural units

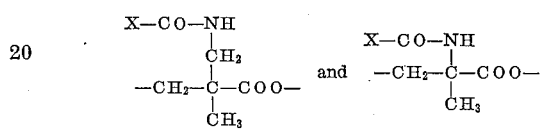

wherein X is selected from the group consisting of hydrogen and arylmethoxy.

5. Poly(oxycarbonyl - 1,1 - dimethyldimethylene/oxycarbonyl - 1-benzyloxycarbonylamino-1-methyldimethylene).

6. Poly(oxycarbonyl - 1,1 - dimethyldimethylene/oxycarbonyl-1-formylaminomethyl-1-methyldimethylene).

References Cited by the Examiner

Beilstein's Handbuch der Organischen Chemie, 18I, 579.

References Cited by the Applicant

UNITED STATES PATENTS 2,777,830   1/1957   Shivers.

JOSEPH L. SCHOFER, *Primary Examiner.*

L. G. CHILDERS, *Assistant Examiner.*